April 8, 1952 — E. G. DAYIE — 2,592,251
SPANNER TOOL TO REMOVE COVERS FROM ARTICLES
Filed Sept. 23, 1950 — 2 SHEETS—SHEET 1
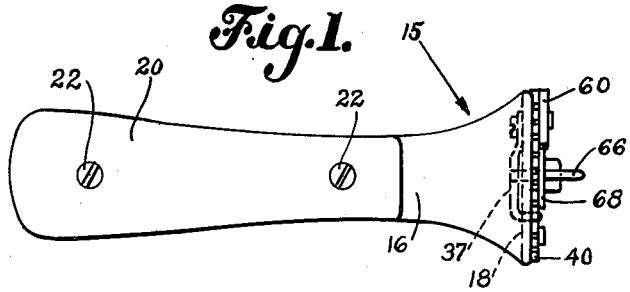
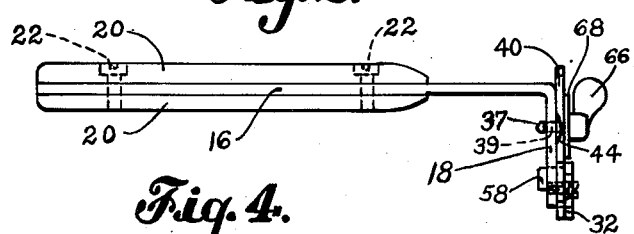
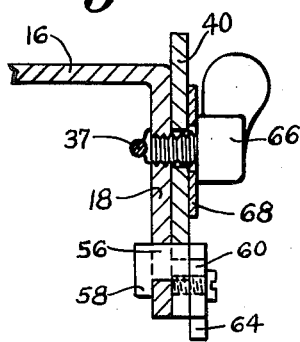
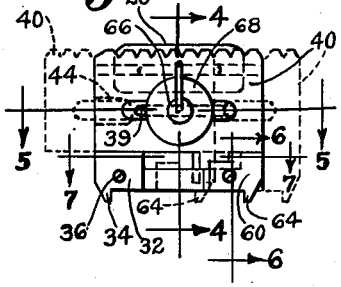
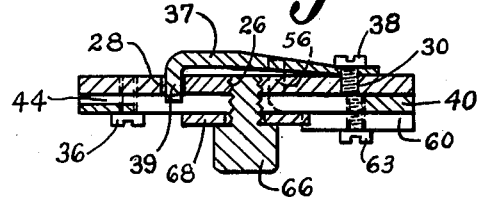
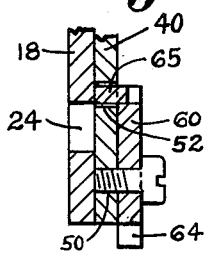
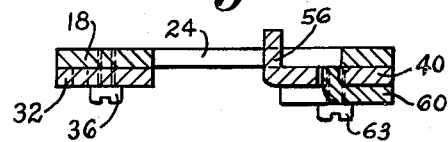
INVENTOR.
Elias G. Dayie
BY Harold E. Cole
Attorney April 8, 1952     E. G. DAYIE     2,592,251
SPANNER TOOL TO REMOVE COVERS FROM ARTICLES
Filed Sept. 23, 1950     2 SHEETS—SHEET 2
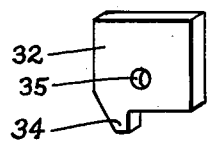
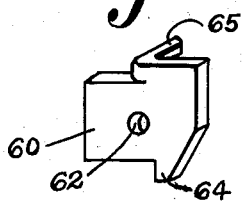
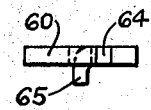
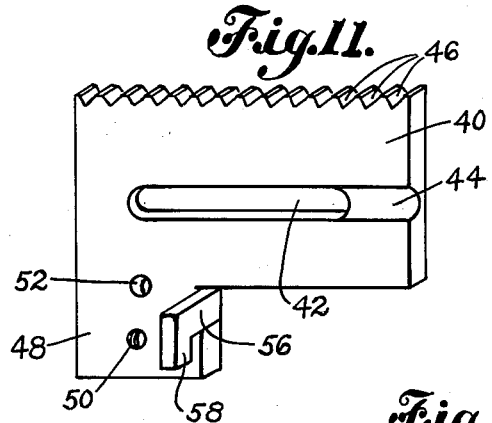
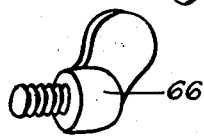
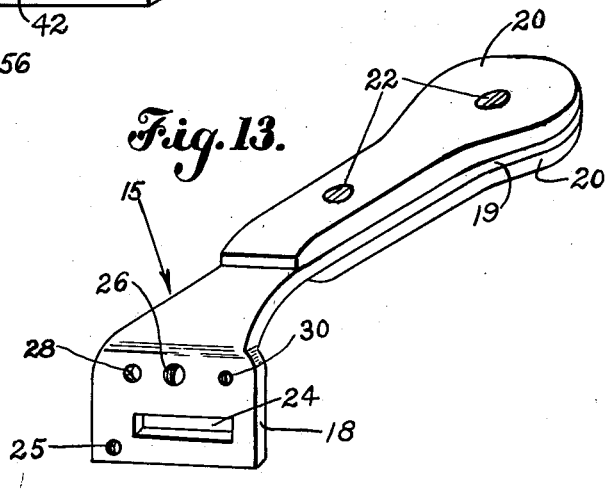
INVENTOR.
Elias G. Dayie
BY Harold E. Cole
Attorney

Patented Apr. 8, 1952 2,592,251

UNITED STATES PATENT OFFICE 2,592,251

SPANNER TOOL TO REMOVE COVERS FROM ARTICLES

Elias G. Dayie, Boston, Mass.

Application September 23, 1950, Serial No. 186,450

6 Claims. (Cl. 81—6)

This invention relates to a spanner tool for removing covers from articles such as watches.

Many watches are of the waterproof type, which have recesses or other depressions in the cover or back to receive the fingers of a spanner tool. The latter is then rotated to remove the cover. Since said recesses are spaced apart varying distances on different watches one of my objects is to provide an improved, quickly adjustable spanner tool to remove covers from watches.

Another object is to so construct said tool that it aids the worker's vision so he can readily see the depressions in the cover as well as the gripping fingers of the tool and thus quickly position the latter so they enter said recesses.

A further object is to provide such a tool that is economical to manufacture and simple to adjust and use.

The foregoing and other objects which will appear as the nature of the invention is better understood, may be accomplished by a construction combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a top plan view of my tool. Figure 2 is a side elevational view and Figure 3 is a front elevational view thereof.

Figures 4, 5, 6 and 7 are sectional views, enlarged, taken on the lines 4—4, 5—5, 6—6 and 7—7 respectively of said Figure 3.

Figure 8 is an enlarged, perspective view of a stationary jaw and Figure 9 is an enlarged, perspective view of another jaw whose position is adjustable. Figure 10 is a lower edge, elevational view of the jaw shown in Figure 9.

Figure 11 is an enlarged, perspective rear view of the slide forming part of my tool. Figure 12 is an enlarged perspective view of the screw that holds said slide to the holder head.

Figure 13 is an enlarged perspective view of the holder forming part of my tool.

As illustrated, my tool has a holder 15 that includes a handle 16 and a head 18 at a right angle thereto and which may be integral therewith and formed of metal, as shown. Said handle 16 has two cover pieces 20 at opposite surfaces held by screws 22 to improve the grip.

Said head 18 has a laterally extending, elongate slot 24 in its lower half portion and a screw-threaded hole 25 at one side thereof. In its upper half portion there is a centrally located, threaded hole 26, and other holes 28 and 30 at opposite sides thereof, the latter being threaded.

A stationary jaw 32 has a gripping finger 34 that tapers downwardly, the outside end surface of which is preferably rectangular or four-cornered.

A screw 36 extends through a hole 35 in said jaw and screw-threadedly connects with said hole 25 to thereby fixedly hold said jaw to said holder head 18 with said finger 34 extending below said head 18 in position of use.

A spring bar 37 is fastened to said holder head 18 by a screw 38 that screw-threadedly connects in said screw-threaded hole 30 and which bar extends to and has an angle portion 39 that passes through said hole 28 and projects slightly beyond it to thereby provide a guide as explained later.

A slide 40 has an elongate slot 42 therein extending laterally and being above said slot 24 in said head when the parts are assembled for use. Immediately beyond said slot 42 at the rear surface a recess 44 is provided in said slide 40 to permit the latter to slide past said projecting spring portion 39. The top edge of said slide is serrated as at 46 to provide a better gripping surface when adjusting said slide. Said projecting portion 39 extends into said slot 42 and serves as a guide for said slide 40.

Extending below the main portion of said slide 40 is a jaw support 48 which has a screw-threaded hole 50 therein and another hole 52 intermediate it and said main portion. Extending rearwardly at a right angle from said jaw support 48 is a stop guide which has a narrow or neck portion 56 of a size to pass through and slide in said holder head slot 24, and also having a larger retainer end 58 which is of a size that cannot pass through said slot 24 when in position of use although being of such thickness that its narrow edge can be inserted therethrough and then said slide can be rotated to position of use on said holder head 18.

Said slide 40 carries a jaw 60 that is fixedly held thereto by a screw 63 extending through a hole 62 in said jaw and that screw-threadedly connects in said jaw support hole 50. Said jaw has a downwardly, tapering, gripping finger 64 extending below said jaw support 48, similar to said finger 34 with which it cooperates to grip a watchcase cover during the screwing or unscrewing movement. Said jaw support 48 has an angular stay member 65 that extends rearwardly into said hole 52 which holds said jaw from rotative movement.

To adjustably hold said slide 40 in the desired position a wing screw 66 extends through a washer 68 and said slot 42 and screw-threadedly connects with the screw threads in said hole 26. When tightened this screw 66 firmly holds said slide 40 so that said finger 64 remains spaced a predetermined distance from said finger 34. Since the space between the holes or depressions in a watchcase cover varies in different watches said jaw 60 is positioned as desired by loosening said screw 66 and sliding said slide 40 until said gripping fingers 34 and 64 are positioned to enter two said depressions in said cover. The screw 66 is then tightened and my tool is rotated to screw or unscrew the cover.

By having said head 18 spaced lower than said handle 16 the watchmaker can see said fingers 34 and 64 and the depressions in the cover, hence, can quickly adjust said slide until finger 64 is in a position to enter one depression and said finger 34 enter another depression.

What I claim is:

1. A spanner tool comprising a holder embodying a handle and a head extending at an angle thereto having an elongate slot intermediate the ends thereof and a hole therein, a jaw carried by said head embodying a gripping finger extending beyond said head, a slide having an elongate slot intermediate the ends thereof and embodying a stop guide extending through and slidably movable in said head slot until it reaches an extremity thereof, said slide carrying a jaw embodying a gripping finger extending beyond said head, and a pin member extending through said slide slot and into said head hole to adjustably hold said slide to said head whereby the distance between said fingers may be varied.

2. A spanner tool comprising a holder embodying a head having an elongate slot intermediate the ends thereof, a jaw carried by said head embodying a gripping finger extending beyond said head, a slide having an elongate slot intermediate the ends thereof and embodying a stop guide extending through and slidably movable in said head slot until it reaches an extremity thereof, said slide carrying a jaw embodying a gripping finger extending beyond said head, and means adjustably holding said head and slide together whereby the distance between said fingers may be varied.

3. A spanner tool comprising a holder embodying a handle and a head extending at an angle thereto having an elongate slot intermediate the ends thereof and a hole therein above said slot, a jaw carried by said head at one side thereof embodying a gripping finger extending beyond said head, a slide having an elongate slot intermediate the ends thereof and embodying a stop guide extending through and slidably movable in said head slot until it reaches an extremity thereof, said slide carrying a jaw at one side thereof embodying a gripping finger extending beyond said head and slide, a pin member extending through said slide slot and into said head hole to adjustably hold said slide to said head whereby the distance between said fingers may be varied.

4. A spanner tool comprising a holder embodying a handle and a head extending at an angle thereto having an elongate slot intermediate the ends thereof and two holes therein, a spring bar attached to said head and embodying an angle portion extending through and projecting beyond one of said head holes to thereby serve as a guide, a slide having an elongate slot therein intermediate the ends thereof and embodying a stop guide extending through and slidably movable in said head slot until it reaches an extremity thereof, a jaw carried by said slide embodying a gripping finger extending beyond said head and slide, said spring bar projecting portion extending into said slot whereby it serves as a guide for said slide as it is moved, and a pin member extending through said slide slot and into the other said head hole to adjustably hold said slide to said head whereby the distance between said fingers may be varied.

5. A spanner tool comprising a holder embodying a handle and a head extending at an angle thereto having an elongate slot intermediate the ends thereof and two holes therein, a spring bar attached to said head and embodying an angle portion extending through and projecting beyond one of said head holes to thereby serve as a guide, a slide having an elongate slot therein intermediate the ends thereof and embodying a stop guide extending through and slidably movable in said head slot until it reaches an extremity thereof, said slide embodying a jaw supporting portion at one side thereof extending beyond the remainder of said slide, a jaw carried by said supporting portion embodying a gripping finger extending beyond said head and slide, said spring bar projecting portion extending into said slide slot whereby it serves as a guide for said slide as it is moved, and a pin member extending through said slide slot and into the other said head hole to adjustably hold said slide to said head whereby the distance between said fingers may be varied.

6. A spanner tool comprising a holder embodying a handle and a head extending at an angle thereto having an elongate slot intermediate the ends thereof and a hole therein, a jaw carried by said head embodying a gripping finger extending beyond said head, a slide having an elongate slot intermediate the ends thereof and a hole therein and embodying a stop guide extending through and slidably movable in said head slot until it reaches an extremity thereof, a jaw carried by said slide embodying a gripping finger extending beyond said head and slide, said latter jaw embodying a stay member extending into said slide hole to thereby hold said jaw firmly in position on said slide, and means adjustably holding said head and slide together whereby the distance between said fingers may be varied.

ELIAS G. DAYIE.

REFERENCES CITED

The following references are of record in the file of this patent:

UNITED STATES PATENTS

| Number | Name | Date |
|---|---|---|
| 986,112 | Wood | Mar. 7, 1911 |
| 1,512,559 | Moore | Oct. 21, 1924 |
| 1,760,784 | Sharke | May 27, 1930 |
| 2,480,565 | Franks et al. | Aug. 30, 1949 |
| 2,542,728 | Thomas | Feb. 20, 1951 |